United States Patent [19]

Kopac et al.

[11] Patent Number: 4,615,372

[45] Date of Patent: Oct. 7, 1986

[54] FOUNDRY BINDER WITH IMPROVED BREAKDOWN AND IMPROVED THERMAL RECLAMATION PROPERTIES

[75] Inventors: Jordan J. Kopac, Franksville, Wis.; Arek Khachaturian, Birmingham, Mich.

[73] Assignee: Delta Resins & Refractories, Milwaukee, Wis.

[21] Appl. No.: 736,336

[22] Filed: Jun. 24, 1985

Related U.S. Application Data

[62] Division of Ser. No. 630,925, Jul. 17, 1984, Pat. No. 4,568,728.

[51] Int. Cl.$^4$ ............................................... B22C 9/00
[52] U.S. Cl. ..................................... 164/16; 164/526; 264/221; 264/225
[58] Field of Search ..................... 164/16, 21, 536; 264/221, 225

[56] References Cited

U.S. PATENT DOCUMENTS 3,705,132 12/1972 Cuscurida ........................... 528/288
4,460,629 7/1984 Haraga et al. ...................... 164/526

Primary Examiner—Jacob Ziegler
Attorney, Agent, or Firm—Donald E. Egan

[57] ABSTRACT

The addition of the metal drier to the phenolic urethane binder enhances the breakdown of the binder when the system is subjected to the elevated temperatures caused by pouring the molten metal into the mold and enhances the subsequent shake out of the sand from the cores and molds.

7 Claims, No Drawings

FOUNDRY BINDER WITH IMPROVED BREAKDOWN AND IMPROVED THERMAL RECLAMATION PROPERTIES

This application is a division of application Ser. No. 630,925, filed July 17, 1984, now U.S. Pat. No. 4,568,728.

BACKGROUND OF THE INVENTION

This invention relates broadly to foundry binders based on organic resins and specifically to resinous binder compositions which are formed by the reaction of low molecular weight phenol formaldehyde condensates and polyisocyanates, known in the foundry trade as phenolic urethanes.

The present invention is particularly useful in connection with phenolic urethane binders which are cured by tertiary amines. The present invention is also particularly useful in connection with phenolic urethane binders which are cured by gaseous tertiary amines, wherein the binders are used to produce sand shapes for which foundry castings are created using lightweight metals such as aluminum, which are cast at relatively low temperatures. The molds and cores made with the binders of the present invention demonstrate superior breakdown and shake out, particularly when used with metals at relatively low casting temperatures.

The binders of the present invention are particularly useful in foundry systems which reclaim the sand by thermal reclamation processes.

Phenolic urethane binders are widely described in the prior art and have been in use for several decades as foundry core sand binders. For example, phenolic urethanes based on high molecular weight phenolic resins (i.e., an average of at least 3 aromatic rings per molecule) are described in U.S. Pat. Nos. 3,409,579 and 3,676,392 to Robins. Phenolic urethane foundry binders of a lower molecular weight type which are the preferred materials for the present invention are described in U.S. Pat. Nos. 4,148,777 to LaBar et al. and 4,311,631 to Myers et al. While the binders described by these prior patents have, in general, been successful with respect to casting ferrous based metals, which are cast at relatively high temperatures, problems have been observed in using the same binder systems in the casting of aluminum with respect to the breakdown and shake out of the cores after the solidification of the metals.

The same problem has been observed in the foundry industry with respect to binders other than phenolic urethane binders. For example, furan resins, phenolic resins, alkyd resins, phosphate polymers and sodium silicates which have been used by the prior art suffer from the same shake out problems as described above for the phenolic urethanes.

In order to provide a core or mold which is strong enough to maintain its shape and surface during the casting of metals, a fairly high level of binder is required. This is true not only with the phenolic urethane binders but the alkyd-oil binders, the polyester polyol binders, and other types of binders known in the field. However, when sufficient binder is mixed with the sand to form cores and molds having adequate strength to permit handling of the cores or molds and adequate abrasion resistance and hot strength, the resulting cores and molds are difficult to break down and it is difficult to remove the sand from the metal casting, particularly when the casting is made at the relatively low casting temperatures of the light metals, such as aluminum.

Because of the practical importance of this problem to the practices of the foundry art, several approaches have been used in the past to eliminate this problem. On the one hand, organic additives such as sugars have been incorporated into the sand mix. On the other, the quantity of binder has been reduced. Binders with inherently less strength or low heat resistance have also been used. Some have incorporated organic peroxides in the binder in order to aid the oxidative degradation of the said binder at high temperatures; others have included inorganic peroxides in their sand mix. While these efforts have been, by and large, successful in reducing the shake-out problem, there have been highly undesirable aspects associated with them obvious to those familiar with the art.

Therefore, the foundry art has been seeking to find a binder system which will produce cores and molds having adequate stengths and abrasions resistance, but which breaks down well at the casting temperatures of aluminum and magnesium to provide easy shake out.

BRIEF SUMMARY OF THE INVENTION

The present invention comprises the addition of a metal drier to the organic resin of a foundry binder system. In the preferred embodiment the foundry binder system comprises a phenolic urethane. The addition of the metal drier to the phenolic urethane binder enhances the breakdown of the binder when the system is subjected to the elevated temperatures caused by pouring the molten metal into the mold and enhances the subsequent shake out of the sand from the cores and molds. The metal drier does not substantially degrade the tensile strength or abrasion resistance of the molds and cores when the mold and core are formed and handled prior to pouring the metal. The presence of the metal drier in the organic resin of the binder system permits the sand to be reclaimed in a thermal reclamation system with a lower input of heat energy.

In a preferred embodiment, the metal drier is a zirconium metal drier. The zirconium metal driers are particularly useful when used with phenolic urethane foundry binders cured with gaseous amines because the zirconium based driers have a relatively low catalytic effect on the urethane forming reaction.

DETAILED DESCRIPTION OF THE INVENTION

The metal drier which is selected for use in the present invention may vary widely as to composition and amount. The breakdown of the binder during the metal pouring operation is enhanced as the amount of metal drier, based on the resin content, is increased. The breakdown is also enhanced by elevated temperatures and increasing time at elevated temperatures. The availability of oxygen also effects the breakdown of the binder.

As is mentioned above, the zirconium driers are preferred because they do not significantly catalyze the urethane-forming reaction, i.e., the reaction by which the phenol formaldehyde condensates react with the polyisocyanates. Manganese driers, such as manganese napthanate and manganese linoresinate are also useful and desirable in that they have a relatively small impact on the catalysis of the urethane forming reaction. Such driers as lead napthanate may also be used but have a profound influence on the speed of the urethane forming reaction.

The organic moiety of the metal drier does not appear to be particularly critical with respect to its participation in the breakdown of the binder system, but the organic moiety is important with respect to the compatability, i.e., solubility, of the metal drier with the resin system. Generally speaking, zirconium naphthanate and zirconium neododeconate are preferred because they are relatively soluble in the low molecular weight phenol formaldehyde condensates and organic solvent solutions of such phenol formaldehyde condensates. The advantages of mutual solubility will be apparent to those skilled in the art.

The role of zirconium in this case can be conceived of as an oxidation catalyst which helps the oxidative thermal degradation of the binder (in the presence of oxygen and heat), to which phenolic binders are in general, very susceptible. In this aspect, the presence of the metal in the binder enhances the reclamation of the sand, because of the binder containing the metal drier will break down with less heat input than would be required for a binder without the metal drier.

Based on the aboe, it is apparent that any metal-containing compound or complex, where the metal therein has catalytic effect on oxidation of organic matter and at the same time has no significant effect on the rate of the urethane reaction, can be useful for the purposes of this patent, provided the metal is soluble in the binder through the agency of an organic moiety or some other chemical means.

Suitable driers for use in the present invention are metal carboxylates or metal soaps and salts of organic acids. Suitable metal driers include compounds of the following formula:

M—R wherein M is a metal. Preferably the metal is zirconium, cobalt, cerium, calcium, manganese, lead, zinc, iron and one of the rare earth metals. Other suitable metals, which are less preferred, include barium, antimony, magnesium, chromium, copper, lithium, molybdenium, nickel, tin and vanadium. R is an organic moiety of from 6 to 50 carbon atoms, and preferably from 10 to 20 carbon atoms. Suitable acids include naphthenic acids, organic acids derived from tall oil, 2-ethyl hexoic and neo-decanoic acids, rosin acids and linseed oil fatty acids. Mixtures of such metal driers may be used.

Copper compounds, such as the copper oxidation catalyst (e.g., Tenneco Chemicals, Super Cats 10-104 and 12-104) which are used as oxidation catalysts in the destruction of diesel fuel smoke, can also be useful.

The amount of metal drier used in connection with the present invention may vary over wide limits, depending upon the type of organic resin involved, the extent of the elevated temperature to which the core or mold will be subjected and the time at which it will remain at the elevated temperature. It has been found, for example, that as little as 2% and as much as 10% by weight of the drier containing 18% or 24% of metal based on the amount of phenol formaldehyde condensate present in the binder may be used. The present invention contemplates the use of from about 0.5 to about 5.5 grams of zirconium metal (calculated as metal without the organic moiety) to 100 grams resin (calculated as the resin solids without solvents). The preferred range is from about 0.75 to about 3.6 grams of zirconium metal to 100 grams of resin solids.

Zirconium driers are commercially available in solutions containing 18% or 24% by weight of zirconium metal. The most preferred composition comprises 7.5% of zirconium drier (24%) based on a resin solution containing about 50% by weight of a low molecular weight phenol formaldehyde condensate in a mixture of organic solvents, because such mixtures are stable and free from phase separation and precipitates at lower temperatures (35°–45° F.). It has been found that as little as 2% of such a zirconium drier will cause enhanced breakdown when the composition is held at temperatures of 1,000° F. for about 5 minutes. The use of 9% of the zirconium drier can achieve substantially complete breakdown in binders held at 1,500° F. for 50 seconds. It is generally believed necessary to achieve temperatures of at least 750° F. in order to achieve substantial advantages from the present invention.

The present invention may be applied to a variety of resins which are used in foundry binders. although the present invention is most effectively employed with the phenolic urethanes, other phenolic resins, such as acid setting phenolics and the shell phenolics (e.g. novolac resins hardened with "hexa"), exhibit enhanced breakdown based on the present invention. It is contemplated that improved breakdown is achieved by applying the present invention to furan resins, including both acid curing and hot box, and alkyd resins which are cured with polyisocyanates to form alkyd urethane binders.

It should be noted here that the basic chemical process of this invention is also very useful in another familiar aspect of the foundry practice, namely, sand reclamation. The usefulness of the catalytic effect of metals in the thermal oxidative decomposition of phenolic resins is also evident in the thermal reclamation of spent sand from shake-out stations. In the reclaiming process, the phenolic coating on sand grains is burned off and ablated from the sand by heat and oxygen in a process very similar to the breakdown of the organic coating in the metal pouring step, as described above.

THE PHENOLIC RESINS

The preferred phenolic resins used in the present invention are obtained by the condensation of a phenolic compound with an aldehyde, and are generally divided into two categories, the "novolac" resins and the "resole" or A-stage resins.

Novolac resins are generally considered permanently soluble, fusible resins in which the polymer chains have phenolic end-groups. They can be cured to insoluble, infusible products upon the addition of a source of formaldehyde, such as hexamethylenetetramine ("hexa") or paraformaldehyde. Novolac resins are prepared using acid catalysts and an excess of phenol.

Conventional resole resins are prepared using an alkaline catalyst with excess formaldehyde and the resulting polymer has pendant methylol groups and usually has ether groups in the bridges which joint the phenolic rings. Since each methylol group constitutes a potential cross-linking site, the resole resins are readily converted to cross-linked, infusible polymers by heating. Conversely, these resins are highly unstable.

Also usable is the butylated phenol-formaldehyde resin of U.S. Pat. No. 4,317,896 and U.S. Pat. No. 4,116,916, which are incorporated herein by reference thereto. In general, such a resin is prepared by reacting phenol with formaldehyde in a 2-stage reaction. The first stage is carried out in the presence of a fairly strong acid, and the second stage is carried out at near-neutral conditions. The resinous product is then dehydrated by azeotropic distillation and is then butylated by reaction with butanol.

The novolac resin useful in the practice of this invention can be any novolac known in the art but preferably it is a low melting novolac. A typical resin will be prepared in a mole ratio of formaldehyde to phenol of about 0.65. Such a resin is most suitable because the solubility and viscosity are the best range for a desirable product. The novolac resin gives good tensile strength in resin bars and forms a hard surface when cured. The present invention contemplates the use of mixtures of low molecular weight condensates of phenol and formaldehyde which are essentially mononuclear, dinuclear or trinuclear in nature as a sand binder for use in the foundry process, wherein they are cured by polymeric isocyanates and a catalyst. Mixtures of such phenolics may be used in the present invention.

The phenolic resins most advantageously used in the present invention are relatively low molecular weight, i.e. those resins which have from about 1.5 to about 2 rings per molecule as measured by NMR. While it is preferred, for purposes of the present invention, to have a mixture of low molecular weight which are substantially free of species of 4 rings and higher, as a practical matter it is difficult to produce the 1.5 to 2.5 ring phenolics which are absolutely free of 4 ring and higher forms using a commercially realistic process. While the preferred process, described below, produces a "low molecular weight" phenolic in the sense that 4 ring and higher species are at or below the threshold of detection using conventional NMR techniques, i.e., about 3 mole percent. The present invention, however, contemplates the use of methylolated phenol mixtures containing as much as 15 to 20 mole percent of such 4 ring and higher species.

THE SOLVENTS

As was mentioned above, it is generally desired to include a solvent in the binder composition in order to lower the viscosity and provide for increased mixability with the sand. The particular type of solvent which is used is not critical, so long as the solvent is inert with respect to the phenolic and the drier. It is preferred to use a solvent or a solvent mixture which is compatible with the phenolic mixture, the drier, and the polyisocyanate. A mixture of moderately polar solvent and aromatic solvent, as is illustrated by the examples below, is preferred for economic reasons. Suitable aromatic solvents include benzene, toluene, xylene, ethyl benzene, naphthalene and the like. Suitable moderately polar solvents include butyl Cellosolve acetate, butyl carbitol, diacetone alcohol, furfural, and the like.

The quantity of solvent used will depend in part on the molecular weight of the phenolic being employed. Therefore, the quantity of solvent used in the binder composition may vary over wide limits. The examples below illustrate compositions made up of approximately 50–55 parts by weight of phenolics and 45–50 parts by weight of solvents.

In applying the binder compositions of the present invention to the foundry process, it is generally preferred to prepare three separate components, namely:
A. resin composition;
B. isocyanate solution; and
C. catalyst solution.

The preferred practice is to use solvents in all three components in order to insure easy mixing of the components with the sand and promote a uniform mixture of the foundry sand with all of the binder components, although it is possible to use some or all of the components without organic solvents, provided the viscosity of such components is adequate to accomplish the required mixing to produce a uniform product.

Generally the "no bake" foundry process is carried out, by first mixing resin composition with the desired amount of aggregate material (typically sand) for use in producing foundry cores and molds. If desired, the catalyst solution may be mixed with the sand at the same time the resin composition is mixed. Alternatively the resin composition and the catalyst may be premixed together or mixed with the sand sequentially, in either order. Next, an appropriate quantity of isocyanate solution is added to the sand-binder mixture and mixed for a time sufficient to produce a uniform foundry sand mix which is then shaped into desired articles by ramming or blowing into a pattern. The foundry sand mix rapidly cures at room temperature in the shape of the pattern as the isocyanate solution reacts with the binder composition.

The "cold box" proces is similar to "no bake" with respect to the mixing of the resin composition and the isocyanate solution, but the catalyst is added, the the form of a vapor after all mixing has been done and the sand-binder mix has been shaped.

THE ISOCYANATES

In the preparation of isocyanate solution of the present invention, numerous polyisocyanates, including di and triisocyanates may be employed. Suitable isocyanates are the aromatic, aliphatic and cycloaliphatic isocyanates and include triphenyl-methane triisocyanate; naphthalene diisocyanate; 4-tert-butyl-m-phenylene diisocyanate; 4,4'-methylene bis(o-tolyl isocyanate); 4,4'-methylene bis(phenyl isocyanate); m-phenylene diisocyanate; 4-chloro 3,3-phenylene diisocyanate; 4,4'-bipheny-lene diisocyanate; 1,5-naphthylene diisocyanate; 1,4-tetramethy-lene diisocyanate; 1,10-decamethylene diisocyanate; 1,4-cyclo- hexylene diisocyanate; 4,4'-methylene bis(cyclohexyl isocyanate); 1,5-tetrahydronaphthylene diisocyanate; toluene-2,4-diisocyanate; 4-chloro-1,3-phenylene diisocyanate; ethylene diisocyanate; ethylidene diisocyanate; propylene 1,2-diisocyanate; cyclohexy lene-1,2-diisocyanate; 3,3'-dimethylbiphenylene-4,4'-diiso-cyanate; 3,3'-dimethoxybiphenylene-4,4'-diisocyanate; 3,3'-di-phenylbiphenylene-4,4'-diisocyanate; 3,3'-dichlorobiphenylene 4,4'-diisocyanate; triphenylene p-p', p"-triisocyanate; furfurylide diisocyanate; benzene triisocyanate; hexane-1,2,6-triisocyanate; 2,2,4-trimethylhexamethylene diisocyanate; methyl-2,6-diisocyanatocaproate; 4-methyl-1,3-diisocyanatocyclohexane; 4,4'-methylene bis(cyclohexyl isocyanate; methane diisocyanate; N,N'N"-tris(6-isocyanatohexamethylene)biuret; 1-chloro-2,4-diisocyanatobenzene; tris(4-isocyanatophenyl)methane; naphthalene diisocyanates; bis(2-isocyanatoethyl)benzene; isophorone diamine diisocyanate; triphenysulfone triisocyanate; trimethylbenzene-2,4,6-triisocyanate; 1-methylbenzene-2,4,6-triisocyanate; diphenyl-2,4,4'-triisocyanate; and 1,6-hexamethylene diisocyanate. The isocyanate part of the present invention is desirably used as a solution in a suitable solvent because the reduced viscosity improves the uniformity of the sand coating. It is possible to use the isocyanate without a solvent.

The binder compositions of the present invention may be cured either with or without a catalyst, but it is preferred to use a catalyst. Conventional catalysts which promote the urethane-forming reaction, including those which are liquid and those which are gaseous, may be used. The preferred catalyst system comprises an amine catalyst.

When a liquid catalyst system is to be used, the main catalyst may comprise any of the standard, soluble amine catalysts, although certain heterocyclic tertiary amines are preferred. In particular, 4-picoline and 4-phenyl propyl pyridine are the preferred amine catalysts. Other amines which may be used include dimethylethanolamine, diethyl cyclohexyl-amine, dimethylanaline, pyridine, triethyl amine, N-methyl morpholine, tetramethyl 1,3-butanediamine 1-methylimidazole, vinyl-imidazole, imidazole and the like.

In those cases wherein the binder is substantially free of organic solvents, it is important to use a catalyst for the urethane reaction which is soluble in the system. It is contemplated that water soluble amine catalyst such as Dabco are the preferred catalysts for use in the binder systems which are substantially free of organic solvents.

The present invention also contemplates the use of gaseous amines to cure the binder compositions of the present invention. Preferably the gaseous amine is a tertiary amine such as trimethylamine, although normally liquid teritary amines such as triethylamine may be used if they are maintained in a suitably volatile form or are suspended in a gaseous medium and then passed through the mold or core. Dimethyl ethyl amine, dimethyl isopropyl amine, triethyl amine, or other amines which have functional groups which do not interfere with the catalytic action of the amine may also be used.

The quantity of catalyst used should be regulated to obtain the cure and strip time desired for the foundry object being produced. This depends, in part, on the quantity of binder composition used with each measure of sand and in part on the size of the core or mold being produced. Desirably the binder is kept as low as possible for economic reasons, in keeping with achieving the required tensile strength to promote stripping and the required hot strength. Although useful cores and molds may be made using less than 1% by weight of binder compositions (exclusive of solvents), based on the weight of the sand, larger amounts of binder may be added if higher tensile strength is required. Generally from about 0.5% to about 5% by weight of the binder composition based on the weight of the sand or other aggregates gives useful results.

DESCRIPTION OF THE BINDER SYSTEM

The following examples serve to illustrate the preparation and use of binder systems with the metal driers of the present invention. These examples also present comparative data on binder systems without the metal drier systems. However, it will be understood that these examples are set forth for illustrative purposes and many other metal drier-binder systems are within the scope of the present invention.

EXAMPLE I

A zirconium drier was added to a "cold box" phenolic urethane system to demonstrate the effect of the zirconium drier on the breakdown of the binder system.

Both the test binder and the control were formulated from a commerical phenol formaldehyde condensation product manufactured by Delta Resins and sold under the trade name "Delta Kure Resin". The polyisocyanate solution, sold by Delta Resins & Refractories under the trade name "Delta Kure Coreactant" was used as a polyisocynanate. In both cases the foundry shape was made from Fairwater silica sand which was admixed with 0.88% by weight of resin (based on the weight of the sand) and 0.72% of the polyisocyanate (based on the weight of sand). The test sample was varied in that prior to mixing with the sand, 10% of a zirconium drier (based on the weight of the resin solution) was mixed with the resin. The zirconium drier contained 18% by weight of metallic zirconium. At these conditions, the 18% zirconium drier solution was completely soluble in the resin, although a slight haze was formed. Upon chilling to 35°–45° F. a phase separation was noted.

The following mixing cycle was used:

The desired quantity of resin was mixed with the zirconium drier for about 1 minute. The resin-zirconium drier mixture was added to the sand which was mixed for about 1 minute. The isocyanate was then added to the sand and mixed for another 1 minute.

After mixture the sand with the binder system, the mixture was blown into a core machine. At the time the room temperature was 72°–73° F. with a relative humidity of about 70%.

After the samples were blown into the core box, there were gassed using the following procedure:

1—Low Pressure Cycle: 1 second @ 10 psig of TEA/$CO_2$

2—High Pressure Cycle: 2 seconds @ 35 psig of TEA/$CO_2$

3—Purge Cycle: 5 seconds @ 35 psig of Nitrogen for a total of 8 seconds. All gases are dry. TEA/$CO_2$=10/90.

Upon removal from the core machine, tensile tests were taken and starch hardness was determined for both samples. The results are shown in Table I below.

TABLE I

| | Tensile Strength (psi) and Scratch Hardness | |
|---|---|---|
| Time | Sample with Zr Dryer | Control Sample |
| Immediate | 120 (62) | 161 (65) |
| 15 Minutes | 249 (67) | 282 (69) |
| 30 Minutes | 280 (69) | 290 (73) |
| 60 Minutes | 287 (71) | 301 (74) |
| 120 Minutes | 294 (72) | 299 (74) |
| Over Night | 280 (73) | 330 (79) |

The scratch hardness figures are shown in parethesis. The water absorption was about the same for both samples.

Samples of the cured sand-binder shapes were placed in a furnace at 1,000° F. After 4 minutes, more than 50% of the zirconium containing sample had disintegrated while the control was more than 98% solid. After 7 minutes, the zirconium contaning sample was completely decomposed and the sample had the color of pure white sand. The control, on the other hand, was still 80% hard and black in color. When the control was heated to 11 minutes it took on a light gray color with about 10% of the composition remaining solid.

EXAMPLE II

A series of experiments were run to determine the effect of the amount of zirconium drier on the resulting binder both with respect to tensile strength and with respect to its breakdown.

Table II below sets forth the results of the resulting cores, made using the cold box process described in Example I, for the binders containing the indicated levels of 18% zirconium drier solution added to the resin solution using the procedure described above. Each sample was placed in the oven for the prescribed time at the prescribed temperature. After the prescribed time had elapsed, the samples were removed from the oven, allowed to cool for 10 minutes. Thereafter each sample was placed on a 20 mesh screen and shaken for 15 seconds. The percentage of the sample remaining after the screening is shown in Table II. Each tensile value shown in Table II is the average of at least 2 cores, while the hardness is an average of at least 6 tests.

TABLE II

| | | | | Percent of sample Remaining After Screening | |
|---|---|---|---|---|---|
| Sample # | Description | Tensile (psi) | Hardness | 1000° F. for 5 Minutes | 1500° F. for 50 Seconds |
| 1 | 0% Zirconium | 323 | 74 | 84.4% | 73.7% |
| 2 | 3% Zirconium | 362 | 76 | 57.3% | 37.3% |
| 3 | 6% Zirconium | 346 | 76 | 48.1% | 27.0% |
| 4 | 9% Zirconium | 319 | 74 | 16.0% | 21.2% |

EXAMPLE III

In order to illustrate the bench life of the compositions containing a zirconium drier, the following test was run:

Samples of the same resin used in Example I were made up using 10% of a 24% zirconium drier. The resin, mixed with the sand and isocyanate was allowed to stand for the times shown in Table III after which cores were made. Tensile and hardness measurements were made on the cores and portions of the cores were then placed in a furnace at 1000° F. The samples were checked at 1 minute intervals and the sample was poked with a spatula to check the collapse. The results of the furnace tests is shown in Table III.

TABLE III

| Sample # | Description | Tensile (psi) | Hardness | (Min) Collapse | (Min) White |
|---|---|---|---|---|---|
| 1 | 2 hrs. old | 308 | 72,73,72 | 8 min | 17 |
| 2 | 3 hrs. old | 288 | 73,70,71 | 11 min | 19 |
| 3 | 4 hrs. old | 339 | 71,72,71 | 9 min | 18 |
| 4 | 4 hrs. old | 311 | 75,70,74 | 10 min | 22 |

EXAMPLE IV

Another test was run to further investigate the effect of zirconium drier on tensile strength and bench life of cold box systems.

Cores were made up using 2,000 grams of Fairwater Sand, 0.88% of 52% resil solution based on the weight of sand, and 0.72% of 74% solids polyisocyanate solution based on the weight of sand. In each case the "resin" was a mixture of approximately 10% by weight of zirconium drier and 90% by weight of the resin solution.

The mixing cycle was as follows:

The resin solution was first mixed with the zirconium drier for about 1 minute, and then added to the sand where it was mixed for about 1.5 minutes. The isocyanate was then added and mixed for 1.5 minutes. The mixture was allowed to remain unagitated, at ambient temperatures for the time periods shown in Table IV. At the time shown, the sand mixture was blown into a mold where it was subjected to a mixture of triethylamine and carbon dioxide. The initial gassing was for 1 second at 10 PSIG, followed by 2 seconds at 30–40 PSIG, followed by 5 seconds of nitrogen about 35 PSIG. The hardness, and tensile values along with the collapse time, are shown below in Table IV.

TABLE IV

| Sample | Time (Min) | Hardness | Tensile (psi) | Collapse Time (Min) |
|---|---|---|---|---|
| 1 | 5 | 61,58,61 | 209,201 | 7 |
| 2 | 15 | 58,65,61 | 258,197 | 9 |
| 3 | 30 | 71,69,70 | 284,255 | 10 |
| 4 | 60 | 71,69,73 | 314,320 | 8 |
| 5 | 120 | 71,72,73 | 314,299 | 8 |

EXAMPLE V

Three samples of sand were cured with the following binders:

1. The binder of Example I with no metal drier.
2. The binder of Example I with 10% by weight of zirconium drier, based on the weight of the resin.
3. A commercial binder sold by Ashland Chemical Co. under the trade name "Isocure 330 and 630".

The samples were placed on a pre-warmed metal plate, about 2 inches in diameter, and placed an oven at 1000° F. The results of the samples are shown in Table V below.

TABLE V

| Minutes | Sample # | Results/Description |
|---|---|---|
| 1 | 1 | Brown/black - rigid |
| | 2 | Brown/black - rigid |
| | 3 | brown/black - rigid |
| 2 | 1 | Brown/black - rigid |
| | 2 | Brown/black - rigid |
| | 3 | Brown/black - rigid |
| 3 | 1 | Brown/black & rigid |
| | 2 | Brown/black & rigid |
| | 3 | Brown/black & rigid |
| 4 | 1 | Brown/black - rigid |
| | 2 | 10% white - rigid |
| | 3 | White fringes - rigid |
| 5 | 1 | Brown/black/rigid |
| | 2 | 30% white - rigid |
| | 3 | 5% white - rigid |
| 6 | 1 | Brown/black - rigid |
| | 2 | 30% crumbled - white |
| | 3 | 10% crumbled - part white |
| 7 | 1 | Rigid |
| | 2 | 100% crumbled - all white |
| | 3 | 20% crumbled - part white |

EXAMPLE VI

In order to demonstrate the reclamation of sand bound with a binder of the present invention, the following experiment was run.

Two cores were made with 1.5% binder (based on the total sand in the composition) wherein one binder contained 7.5% of a 24% zirconium drier admixed with the resin portion of the binder. The other core was made with the same binder, but the resin portion contained no metal drier. The cores were cured under the same conditions. Portions of the cores were placed in a crucible and heated to 1,000° F. for 20 minutes so that both cores would be subjected to the same amount of heat input. The results are set forth in Table VI below. The data demonstrates that the presence of the zirconium drier in the binder resulted in 96% by weight of the binder being burned off, as compared to 52% by weight of the binder being burned off for the control containing no zirconium drier.

TABLE VI

|  | 7.5% Zirconium In Resin | 0% Zirconium In Resin |
|---|---|---|
| Crucible + Core Weight | 395.08 grams | 404.32 grams |
| Weight After Heat | −392.02 grams | −402.64 grams |
| Weight Loss | 3.06 grams | 1.68 grams |
| Total Weight | 395.08 grams | 404.32 grams |
| Crucible Weight | −182.77 grams | −191.05 grams |
| Core Weight | 212.31 grams | 213.27 grams |
| % Binder | × .015 | × .015 |
| Binder Weight | 3.18 grams | 3.19 grams |

$$\frac{\text{Weight Loss}}{\text{Binder Weight}} = \frac{3.06}{3.18} = 96\% \text{ Loss In Binder} \quad \frac{1.68}{3.19} = 52\% \text{ Loss In Binder}$$

While the present invention has been described in the context of a binder system used in the practice of the foundry process, it will be understood that the present invention may be applied to other arts wherein an adhesive-like material is required to bind solid material together where high temperature breakdown is required. Those skilled in the art will be aware that many variations may be made on the present invention, both in and out of the foundry field. Those skilled in the art will be aware that forms of invention herein shown and described are to be considered only as illustrative. It will be apparent to those skilled in the art that numerous modifications may be made therein without departure from the spirit of the invention or the scope of the appended claims.

We claim:

1. The process of preparing shaped foundry products having improved breakown which comprises:

(a) forming a foundry mix by uniformly distributing on a foundry aggregate containing sand as a major constituent a binding amount of up to 10% based on the weight of the aggregate of a binder comprising a mixture of a low molecular weight condensation product of phenol and formaldehyde, and a metal drier wherein the metal portion of said drier comprises from 0.5% to about 5.5% by weight based on weight of said phenol formaldehyde condensation product;
   (b) mixing therewith a polyisocyanate in a concentration of 10 to 500% by weight based on the weight of said phenol formaldehyde condensation product;
   (c) shaping the foundry mix in a mold; and
   (d) permiting said binder composition to react with said polyisocyanate to bind the shaped foundry mix.

2. The process of claim 1, wherein the metal drier is a zirconium compound.

3. The process of claim 2, wherein the zirconium compound comprises the napthenate.

4. The process of claim 1, wherein the metal drier comprises about 7.5% of a 24% zirconium drier based on a solution of about 50% by weight phenol formaldehyde condensate in a mixture of organic solvents.

5. The process of claim 1, comprising the additional step of passing a gaseous tertiary amine through the shaped foundry mix.

6. The process of claim 1, wherein foundry mix (a) includes a tertiary amine catalyst.

7. The process of claim 6, wherein the tertiary amine catalyst is selected from the group consisting of 4-phenyl propyl pyridine, 4-picoline, and vinyl imidazole.

* * * * *